United States Patent
Arato et al.

(10) Patent No.: US 7,035,323 B1
(45) Date of Patent: Apr. 25, 2006

(54) SYSTEM AND METHOD FOR COMBINING MULTIPLE DIGITAL SUBSCRIBER LINE TRANSCEIVERS

(75) Inventors: Laszlo Arato, Newport Beach, CA (US); Russell W. Bell, Wall, NJ (US); Luke J. Smithwick, Monmouth Beach, NJ (US)

(73) Assignee: Globespan, Inc., Red Bank, NJ (US)

( * ) Notice: Subject to any disclaimer, the term of this patent is extended or adjusted under 35 U.S.C. 154(b) by 1000 days.

(21) Appl. No.: 09/632,029

(22) Filed: Aug. 2, 2000

Related U.S. Application Data

(60) Provisional application No. 60/146,661, filed on Aug. 2, 1999.

(51) Int. Cl.
*H04B 1/38* (2006.01)
(52) U.S. Cl. ...................................... 375/222; 375/219
(58) Field of Classification Search ................ 375/219, 375/220, 221, 222, 223; 370/464, 465, 468
See application file for complete search history.

(56) References Cited

U.S. PATENT DOCUMENTS

| | | | | |
|---|---|---|---|---|
| 5,751,338 A | | 5/1998 | Ludwig, Jr. .................. 348/17 |
| 5,809,070 A | * | 9/1998 | Krishnan et al. ............ 375/222 |
| 5,815,505 A | | 9/1998 | Mills .......................... 370/522 |
| 5,864,592 A | * | 1/1999 | Itri .............................. 375/375 |
| 5,898,761 A | * | 4/1999 | McHale et al. ........... 379/93.01 |
| 5,933,605 A | * | 8/1999 | Kawano et al. .............. 709/238 |
| 6,005,873 A | | 12/1999 | Amit ........................... 370/494 |
| 6,069,879 A | * | 5/2000 | Chatter ........................ 370/295 |
| 6,081,291 A | | 6/2000 | Ludwig, Jr. .................. 348/16 |
| 6,198,749 B1 | * | 3/2001 | Hui et al. .................... 370/463 |
| 6,327,264 B1 | * | 12/2001 | Terry et al. .................. 370/445 |
| 6,385,203 B1 | * | 5/2002 | McHale et al. .............. 370/401 |

* cited by examiner

*Primary Examiner*—Young T. Tse
*Assistant Examiner*—Sam K. Ahn
(74) *Attorney, Agent, or Firm*—Thomas, Kayden, Horstemeyer & Risley

(57) ABSTRACT

A multi-channel DSL communication link in accordance with the present invention may comprise a plurality of N DSL transceivers each configured with at least two bi-directional serial data interfaces with the first interface of a first transceiver coupled to a communication interface and the second interface of the first transceiver coupled to a first bi-directional serial data port of a second transceiver. Subsequent transceivers may be coupled in this manner with its $N^{th}-1$ and $N^{th}+1$ nearest transceivers. A method for transferring data between multiple transceivers is also disclosed, which can be described as follows: recovering a mapped portion of a downstream data stream at each of N DSL transceivers; communicating the portion to the next closest transceiver to a communication interface; and mapping an upstream data stream for transmission via the N transceivers; using each respective transceiver's second data interface to communicate a mapped portion to the next furthest transceiver.

50 Claims, 9 Drawing Sheets

US 7,035,323 B1

SYSTEM AND METHOD FOR COMBINING MULTIPLE DIGITAL SUBSCRIBER LINE TRANSCEIVERS

CROSS-REFERENCE TO RELATED APPLICATION

The present application claims the benefit of co-pending U.S. provisional patent application, issued Ser. No. 60/146,661, and filed Aug. 2, 1999, which is hereby incorporated by reference in its entirety.

FIELD OF THE INVENTION

The present invention generally relates to high-speed data communications. More specifically, the invention relates to a system and method for combining a plurality of co-located digital subscriber line (DSL) transceivers at a customer site.

BACKGROUND OF THE INVENTION

With the advancement of technology, and the need for instantaneous information, the ability to transfer digital information from one location to another, such as from a central office (CO) to a customer premise (CP), has become more and more important.

A digital subscriber line (DSL) communication system is but one example of a number of communication systems that may simultaneously transmit and receive digital data between two locations. In a DSL communication system, data is transmitted from a CO to a CP via a transmission line, such as a two-wire twisted pair, and is transmitted from the CP to the CO as well, either simultaneously or in different communication sessions. The same transmission line might be utilized for data transfers by both sites or the transmission to and from the CO might occur on two separate lines. Specifically, FIG. 1 illustrates communication between a central office (CO) 10 and a customer premise (CP) 20 by way of twisted-pair telephone line 30. While the CP 20 may be a single dwelling residence, a small business, or other entity, it is generally characterized as having plain old telephone system (POTS) equipment, such as a telephone 22, a public switched telephone network (PSTN) modem 25, a facsimile machine (not shown), etc. The CP 20 may also include an DSL communication device, such as a DSL modem 23 that may permit a computer 24 to communicate with one or more remote networks via the CO 10. Often when a DSL service is provided, a POTS filter 21 is interposed between the POTS equipment such as the telephone 22 and the twisted-pair telephone line 30. As is known, the POTS filter 21 includes a low-pass filter having a cut-off frequency of approximately 4 kilohertz to 10 kilohertz, in order to filter high frequency transmissions from the DSL modem 23 and to protect the POTS equipment.

At the CO 10, additional circuitry is provided. Generally, a line card 18 containing line interface circuitry is provided for electrically coupling a data transmission to the twisted-pair telephone line 30. In fact, multiple line cards 14, 18 may be provided (two shown for simplicity of installation) to serve a plurality of local loops. In the same way, additional circuit cards are typically provided at the CO 10 to handle different types of services. For example, an integrated services digital network (ISDN) interface card 16, a digital loop carrier line card 19, and other circuit cards supporting similar and other communication services, may be provided.

A digital switch 12 is also provided at the CO 10 and is configured to communicate with each of the various line cards 14, 16, 18, and 19. On the outgoing side of the CO (i.e., the side opposite the various local loops), a plurality of trunk cards 11, 13, and 15 are typically provided. For example, an analog trunk card 11, a digital trunk card 13, and an optical trunk card 15 are illustrated in FIG. 1. Typically, these circuit cards have outgoing lines that support numerous multiplexed DSL service signal transmissions.

Asymmetric DSL (ADSL) is an important variation of the basic DSL. ADSL gets its name from its inherent asymmetry between the various data rates. The upstream data rate (i.e., the data from the CP 20 to the CO 10) is a factor of 10 smaller than the associated downstream data rate (i.e., the data from the CO 10 to the CP 20). The asymmetry of ADSL suits transmission control protocol/Internet protocol (TCP/IP) traffic quite well as it matches the expected upstream and downstream data rates associated with Internet technologies, making ADSL the DSL variation of choice for inexpensive high-speed Internet access. ADSL permits simultaneous POTS operation along the same twisted-pair telephone line 30, thereby allowing DSL service providers easy access to potential customers already connected to the PSTN. In addition to the asymmetry of the upstream and downstream data paths, ADSL uses rate adaptation techniques to select an optimum rate based on individual twisted-pair telephone line 30 conditions.

With ADSL transceivers, the maximum usable data rate may be determined by a number of factors. A first factor, the transceiver technology, may comprise the digital encoding and modulation scheme of the underlying ADSL communications standard, as well as, amplifier efficiency, and noise immunity associated with the hardware used to realize the DSL transceiver. A second factor may comprise the quality and distance of the twisted-pair telephone line 30 comprising a local loop used to provide a data transmission medium between the ADSL transceiver and an associated CO-ADSL transceiver that may be provided on the line card 18. A third factor may comprise the relative strength of local radio-frequency transmissions that may interfere with the DSL frequency range (not shown). With rate adaptive DSL communications systems, such as ADSL, slower data rates can be traded in exchange for increased distances between COs 10 and remote CPs 20.

In order to achieve higher data rates with a fixed distance or with a given non-rate adaptive DSL transceiver technology, two or more DSL lines may be combined. By way of example, high-speed DSL (HDSL) technology uses two pairs of twisted copper wire, HDSL transceivers, and multiplexers and demultiplexers at each end of a communication link to provide T1 capacity service over two pairs of twisted copper conductors commonly used in local loops within the PSTN.

In general, DSL implementations are configured such that each DSL transceiver at a CP 20 has its own dedicated interface with the customer premise equipment (CPE). In order to combine two or more DSLs at a CP 20 an additional multiplexing unit is required. The additional multiplexing unit can be realized in a programmable microprocessor or with a dedicated application specific integrated circuit (ASIC). In either case, the number of components, the complexity of the system, and the footprint of the system increases dramatically.

The prior art HDSL link illustrated in FIG. 2 is offered by way of example to highlight the additional interface equipment required as additional transmission media are added to increase the performance of a communications link. In this regard, FIG. 2 illustrates a basic HDSL network link architecture. As illustrated in FIG. 2, a HDSL network link 40 may comprise equipment located within a CO 10', equipment located within a CP 20', and a HDSL 50. More specifically, the central office 10' may comprise a plurality of trunk line interfaces 11, 13, and 15, herein labeled analog trunk card, digital trunk card, and optical trunk card respectively; a digital switch 12; and a plurality of HDSL termination units—central office (HTU-C) 42a, 42b, 42c, ..., and 42x. As illustrated in FIG. 2, each HTU-C 42a, 42b, 42c, ..., and 42x may be coupled via two twisted pair telephone transmission lines 30 to a dedicated HDSL termination unit—remote (HTU-R) 44c (one shown for simplicity of illustration). As also illustrated in FIG. 2, the combination of the HTU-C 42c, the two twisted pair telephone transmission lines 30, and the HTU-R 44c may comprise a HDSL 50. As further illustrated in FIG. 2, the CP 20' may comprise a customer interface 46 and customer premise equipment 48.

It is significant to note that downstream and upstream data transmissions that are transmitted across the HDSL network link 40 of FIG. 2 must be processed at the HTU-Rs 44 and the HTU-Cs 42 in order to ensure that data transmissions are inverse multiplexed and reconstructed into their original configuration. Each of the HTU-Rs 44 and the HTU-Cs 42 may further comprise a transceiver and a mapper (both not shown). At one end of the HDSL communications network 40, a first mapper may be used to inverse multiplex or distribute a data transmission across multiple transmit media. At the opposite or receiving end of the HDSL communications network 40, a second mapper may be used to multiplex or reconstruct the original data transmission. By way of example, a downstream data transmission may be inverse multiplexed such that a portion of the data is transmitted via the HTU-C 42c across a first twisted pair telephone transmission line 30a with the remaining portion of the data transmission sent via a second twisted pair telephone transmission line 30b. After the first and second portions of the data transmission are received and reconstructed by the HTU-R 44c, the first and second portions of the original data stream may be multiplexed before being forwarded to the customer interface 46 and the CPE 48. Often the customer interface 46 is implemented with a router having a port coupled with one or more HTU-Rs 44 and or other network interface devices.

It will be appreciated that the complexity and associated increase in the hardware required to implement a multiple DSL communication system may be significant factors that may prevent the success of a multi-channel DSL communication system. In light of the expected implementation and operational cost erosion for all data delivery technologies, it is highly desirable to identify and implement communication systems with increased performance with minimal added cost and complexity.

Accordingly, there is a need for a communication system and method that can increase the range and data rate of a DSL communication link between two locations while minimizing installation and operational complexity, space requirements, and cost.

SUMMARY OF THE INVENTION

In light of the foregoing, the invention is a system and a method for combining multiple DSL communication links at both sides of a DSL communication link. A multi-channel DSL communication link in accordance with the present invention may achieve an overall higher data transfer rate and/or a longer reach. The multi-channel DSL link of the present invention achieves increased performance without adding multiplexing units at either a central office or at the customer premise, thus offering a solution with minimal impact to installation complexity. A multi-channel DSL communication link in accordance with the present invention may comprise a plurality of DSL transceivers each configured with at least two bi-directional serial data interfaces with a first bi-directional serial data interface of a first DSL transceiver coupled to a communication interface and a second bi-directional serial data interface of the first DSL transceiver coupled to a first bi-directional serial data port of a second DSL transceiver, each subsequent DSL transceiver may be coupled in this manner with its $N^{th}-1$ and $N^{th}+1$ nearest DSL transceivers, with a bi-directional serial data interface of a last DSL transceiver coupled to the second bi-directional serial data interface of the preceding DSL transceiver.

The present invention can also be viewed as providing a method for transferring data between multiple DSL transceivers. In its broadest terms, the method can be described by the following steps: recovering a mapped portion of a first data stream at each of M DSL transceivers; using a first data interface coupled to each respective DSL transceiver to communicate the recovered portion of the first data stream to the next closest DSL transceiver to a communication interface; mapping a second data stream for transmission via each of the M DSL transceivers; using a second data interface coupled to each respective DSL transceiver to communicate mapped portions of the second data stream to the next furthest DSL transceiver from the communication interface; and identifying mapped portions of the second data stream designated for transmission at each of the M DSL transceivers.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

A multi-channel DSL communication link system in accordance with the present invention achieves increased performance without adding multiplexing units at the customer premise, by taking advantage of the inherent flexibility in the preferred data transfer protocols. Furthermore, a method for transferring data between multiple DSL transceivers at a customer premise in accordance with the present invention provides a uniform and scalable solution for using, programming, and configuring multiple DSL transceivers in a "DSL line bonding" application. Before focusing on the system and method of the present invention, a brief explanation follows concerning standard data transfers between data processing devices.

The Reference Model for Open Systems Interconnection

Figure 1:
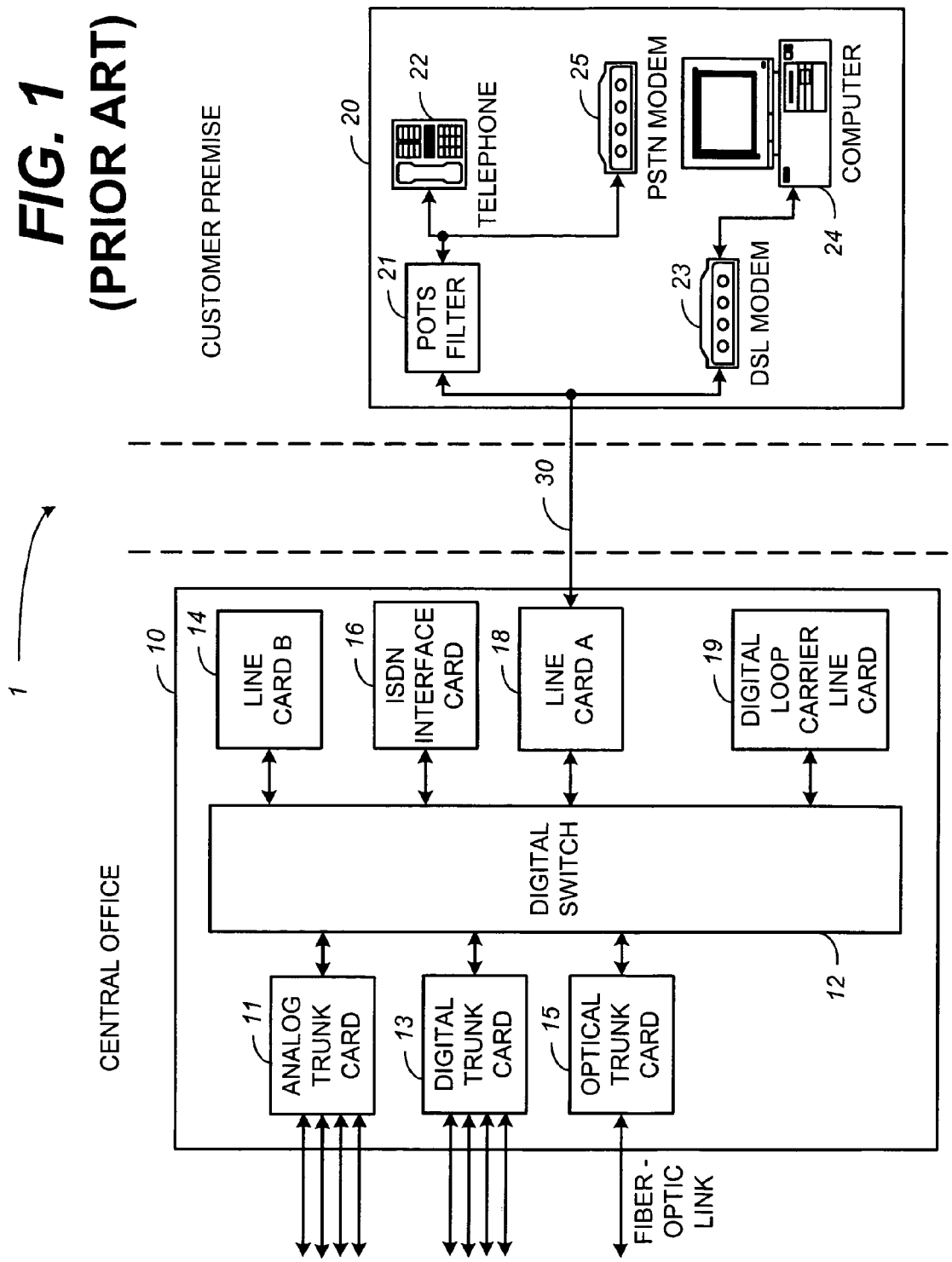
FIG. 1 is a prior art block diagram illustrating a DSL communications system between a CO and a CP.
Figure 2:
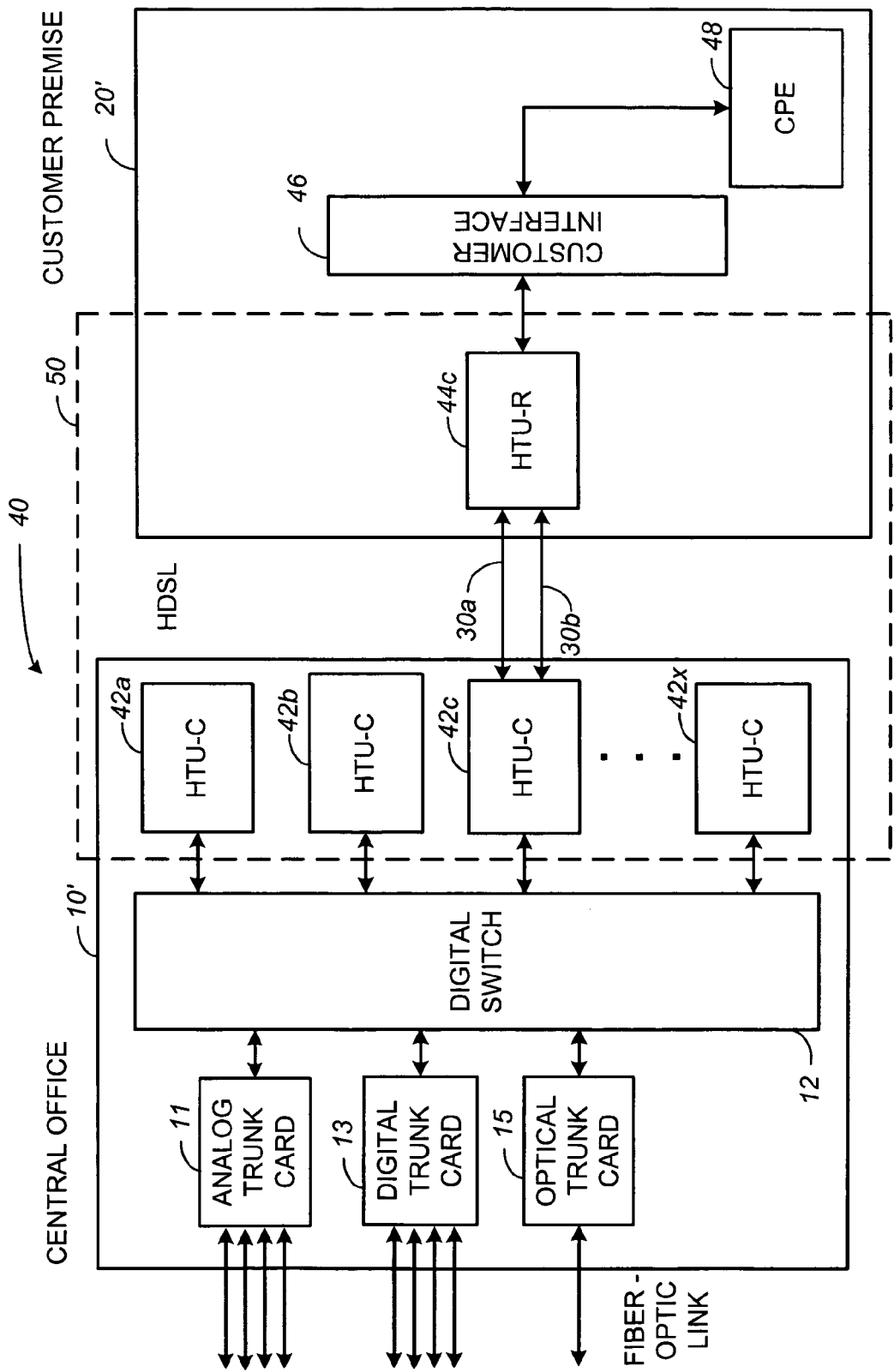
FIG. 2 is a prior art block diagram illustrating a HDSL communication link that increases total link bandwidth by using two twisted pair telephone lines as the data transmission medium.
Figure 3A:
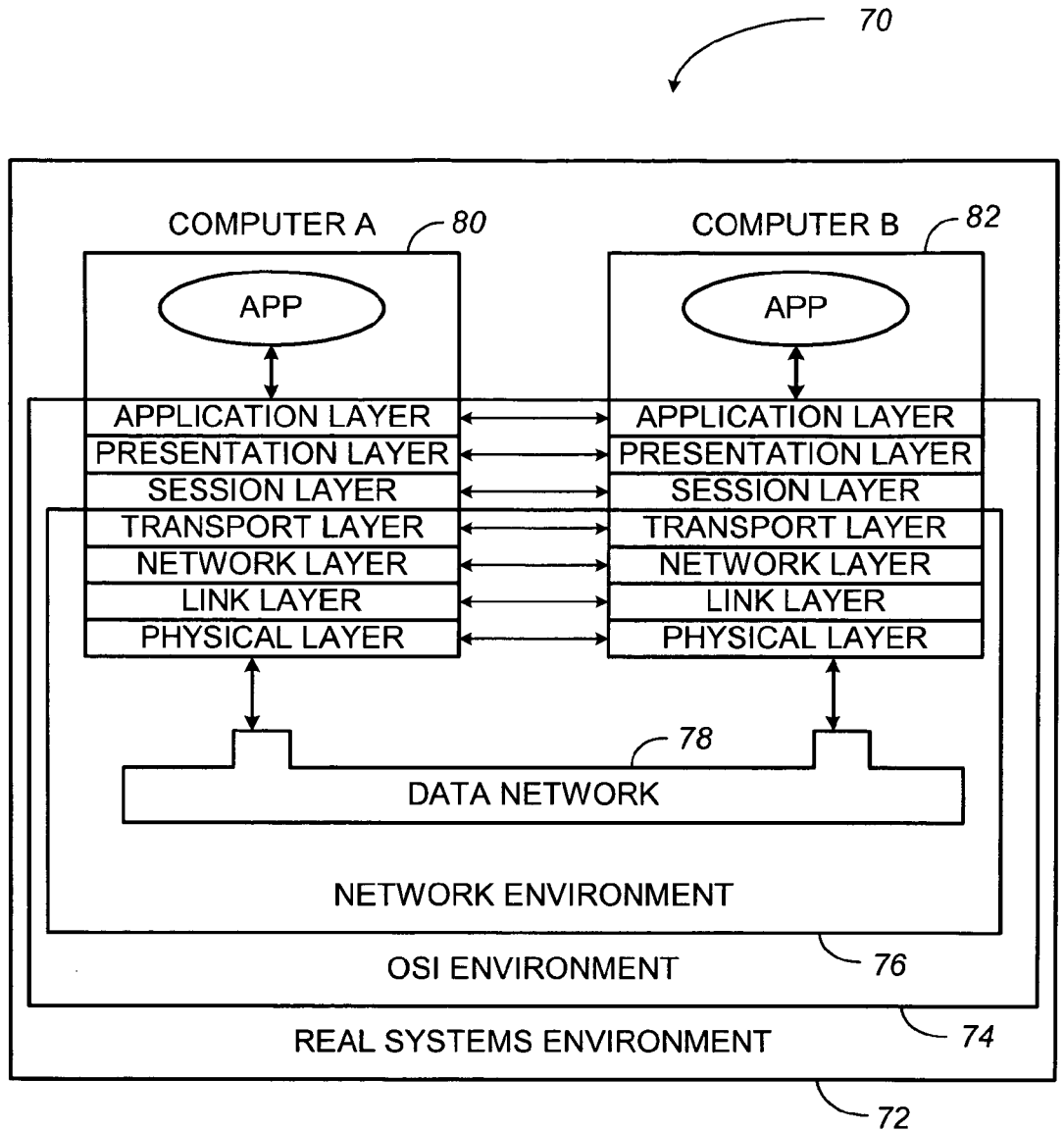
FIG. 3A is a diagram illustrating the operational environments in the International Standards Organization reference model for open systems interconnection (OSI)

FIG. 3A is a diagram illustrating the operational environments in the International Standards Organization (ISO) reference model for open systems interconnection (OSI). As illustrated in the ISO reference model for OSI shown in FIG. 3A, a network communication link 70 may be established between a first computer 80, herein labeled, "computer A" and a second computer 82, herein labeled, "computer B," when the computers 80, 82 are coupled to a data network 78. A communication system may comprise a complex configuration of both hardware and software. Early attempts at implementing software for such systems were often based on a single, complex, and unstructured program with many interacting components. The resulting software was difficult to test, troubleshoot, and modify.

To overcome these problems, the ISO adopted a layered approach in creating a reference model for data communications systems. The complex communication system is broken down into multiple layers, each of which performs a well-defined function. Conceptually, the layers can be considered as performing one of two generic functions, either network-dependent functions or application-oriented functions. The functional breakdown defining network functions and application-oriented functions gives rise to three distinct operational environments: the network environment 76, the OSI environment 74, and the real-systems environment 72.

The network environment 76 is concerned with the protocols and standards relating to the different types of underlying data communication networks. The OSI environment 74 encompasses the network environment 76 and adds additional application oriented protocols and standards to allow end user systems (i.e., the computers 80, 82) to communicate with one another. The real-systems environment 72 builds on the OSI environment 74 and is concerned with an individual manufacturer's proprietary software and services developed to perform a particular distributed information processing task.

As further illustrated in FIG. 3A, both the network-dependent and the application-oriented components of the OSI model are operative within computers 80, 82 and are represented as a number of layers. Each layer performs a well-defined function in the context of the network communication link 70. Each layer operates according to a defined protocol by exchanging messages, both user data and additional control information, with a corresponding peer layer in a remote system (i.e., the computers 80, 82). This concept is illustrated in FIG. 3A by way of the two-headed arrows between each of the respective layers. Each layer has a defined interface between itself and the adjacent layers both above and below. Consequently, the implementation of a particular protocol layer is independent of all other layers.

As shown in FIG. 3A, the logical structure of the ISO reference model is made up of seven protocol layers. The three lowest layers, the network layer, the link layer, and the physical layer, are network dependent and are concerned with the protocols associated with the data communication network being used to link the computers 80, 82. In contrast, the three upper layers, the application layer, the presentation layer, and the session layer, are application-oriented and are concerned with the protocols that allow two end-user application processes (computer programs) to interact with each other. The intermediate transport layer, masks the upper level application-oriented layers from the details of the lower network-dependent layers. Essentially, the transport layer builds on services provided by the network-dependent layers to provide the application-oriented layers with a network independent message interchange service.

Figure 3B:
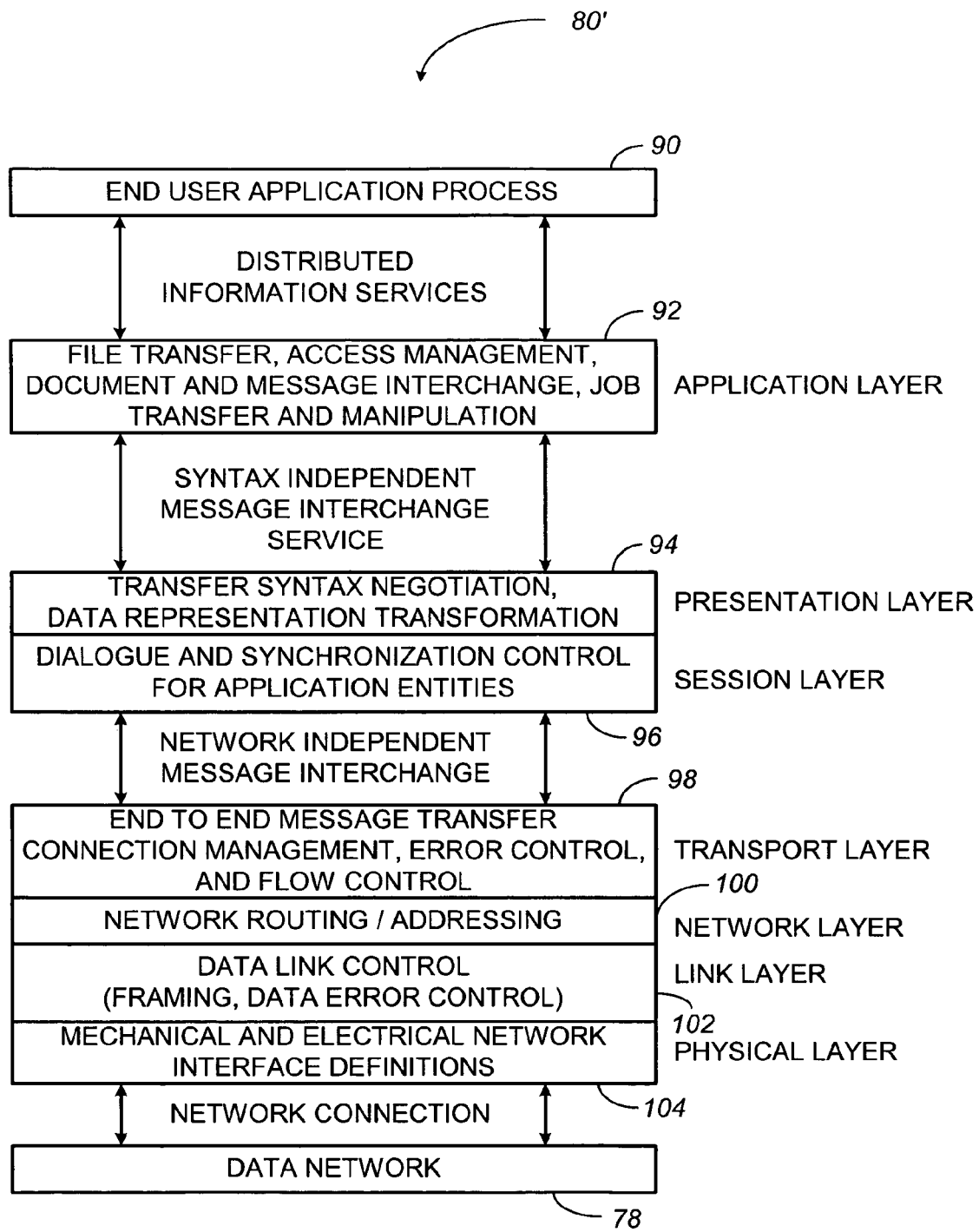
FIG. 3B further illustrates the protocol layers between the data network and computer A illustrated in FIG. 3A.

Having described the ISO reference model for OSI with regard to FIG. 3A, reference is now directed to FIG. 3B. In this regard, FIG. 3B further illustrates the functionality imbedded within the seven layers between the first computer 80 and the data network 78 introduced in FIG. 3A.

As illustrated in FIG. 3B, the protocol layers within the first computer 80' are as follows: the application layer 92, the presentation layer 94, the session layer 96, the transport layer 98, the network layer 100, the link layer 102, and the physical layer 104. The function of each of the seven layers introduced with regard to the reference model for OSI in FIG. 3A is specified formally as a protocol that defines the set of rules and conventions used by each layer to communicate with a peer layer in a remote computer 82 (not shown). Each layer provides a set of services to the layer immediately above. It also uses the services provided by the layer immediately below to transport the message units associated with the protocol to the remote peer layer. By way of example, the transport layer 98 provides a network-independent message transport service to the session layer 96 above it and uses the service provided by the network layer 100 below it, to transfer the set of message units associated with the transport protocol to a transport layer 98 located in the second (remote) computer 82 (see FIG. 3A).

Application-Oriented Layers

The Application Layer

The application layer 92 provides the user interface between an end-user application process 90 (i.e., a computer program) and a range of networking distributed information services as illustrated in FIG. 3B. Such services may take the form of file transfer, access, and management, as well as, general document and message interchange services such as electronic mail.

Access to application services is normally achieved through a defined set of primitives, each with associated parameters, which are supported by the local operating system. The access primitives function similarly to other well-known operating system calls and result in an appropriate operating system procedure being activated. These operating system calls use the communication system (software and hardware) as if it were a local device within its own computer, such as a hard disk drive controller. The detailed operation of the communication system below is transparent to the computer user and to the application layer 92 as well. When the application process is performed, one or more parameters are returned indicating the status of the process attempted (success or otherwise). In addition to information transfer, the application layer 92 provides such services as: identification of one or more intended destination devices; determination of the availability of the one or more destination devices; establishment of authority to communicate; agreement on privacy (encryption techniques) mechanisms; authentication of the intended one or more destination devices; selection of a dialogue discipline; agreement on the responsibility for error recovery; and identification on constraints for data syntax. For simplicity of illustration, the aforementioned application layer 92 functions are designated file transfer, access management, document and message interchange, job transfer and manipulation (see FIG. 3B).

The Presentation Layer

The presentation layer 94 is concerned with the syntax of data during data transfer between communicating end-user application processes 90. To achieve a true OSI, a number of abstract data syntax forms have been defined for use by end-user application processes 90 together with associated transfer syntaxes. The presentation layer 94 negotiates and selects an appropriate transfer syntax to be used during the course of a particular transaction to maintain data integrity between the two end-user application processes 90.

To illustrate the services performed by the presentation layer, consider a telephone conversation between individuals that speak separate and distinct languages. Assume that each speaker uses an interpreter and that the only common language between the interpreters is English. In order to facilitate communication, each interpreter must translate from their local language to English and vice versa. The two speakers are analogous to two end-user application processes 90 with the two interpreters representing the presentation layer. Both local syntaxes (the local languages), as well as, a common syntax (English) are used by the parties to communicate. It is important to note that there must be a universally understood language, which must be defined and used by the interpreters in order for the speakers to communicate.

Another function of the presentation layer 94 is concerned with data security. In some applications, data sent by an end-user application process 90 is first encrypted using a key, which is known by the intended recipient of the data. The recipient decrypts any received data using the key before passing the data to the destination end-user application process 90.

The Session Layer

The session layer 96 provides a means to enable two application layer protocol entities to organize and synchronize their dialogue and manage the data exchange. It is thus responsible for setting up and clearing a communication channel between two communicating application layer protocol entities (actually presentation layer protocol entities) as illustrated in FIG. 3B.

A number of optional services are provided, including the following: interaction management (duplex/half-duplex); synchronization, for managing data transfers when a data fault is encountered; and exception reporting when an unrecoverable fault is encountered during a data transfer.

Interface Between the Application-Oriented Layers and the Network-Dependent Layers The Transport Layer The transport layer 98 provides an interface between the higher application-oriented layers and the underlying network-dependent layers. It provides the session layer 96 with a message transfer facility that is independent of the underlying network type. By providing the session layer 96 with a defined set of message transfer facilities, the transport layer 98 hides the detailed operation of the network layer 100 from the session layer 96.

The transport layer 98 offers a number of service classes, which cater to the varying quality of service provided by different types of networks. There are five service classes ranging from class 0, which provides only basic functionality required to establish a connection and perform a data transfer, to class 4, which provides full error control and flow control procedures. By way of example, a class 0 data transfer may be selected for use with a packet-switched data network, whereas, a class 4 data transfer may be selected for use with a LAN.

Network-Dependent Layers

The lowest three layers of the ISO reference model are network dependent, as such their detailed operation varies from one network type to another. However, some generalities can be made as further illustrated in FIG. 3B.

The Network Layer

The network layer 100 is responsible for establishing and clearing a network wide connection between to two transport layer protocol entities. It includes such facilities as network routing and addressing and, in some instances, flow control across the computer to network interface. In the case of internetworking, the network layer 100 provides various harmonizing functions between the interconnected networks.

The Link Layer

The link layer 102 builds on the physical connection provided by the particular data network 78 to provide the network layer 100 with a reliable information transfer facility. The link layer 102 is responsible for error detection, and in the event of transmission errors, the retransmission of messages. Two types of service are provided: connectionless service treats each information frame as a self-contained entity that is transferred using a best-try approach; and connection oriented service endeavors to provide an error-free information transfer facility.

The Physical Layer

Finally, the physical layer 104 is concerned with the physical and electrical connections or interfaces between the first computer 80' and the data network 78. The physical layer 104 provides the link layer with a means of transmitting a serial bit stream between the communicating computers 80', 82 (remote computer B not shown).

Figure 3C:
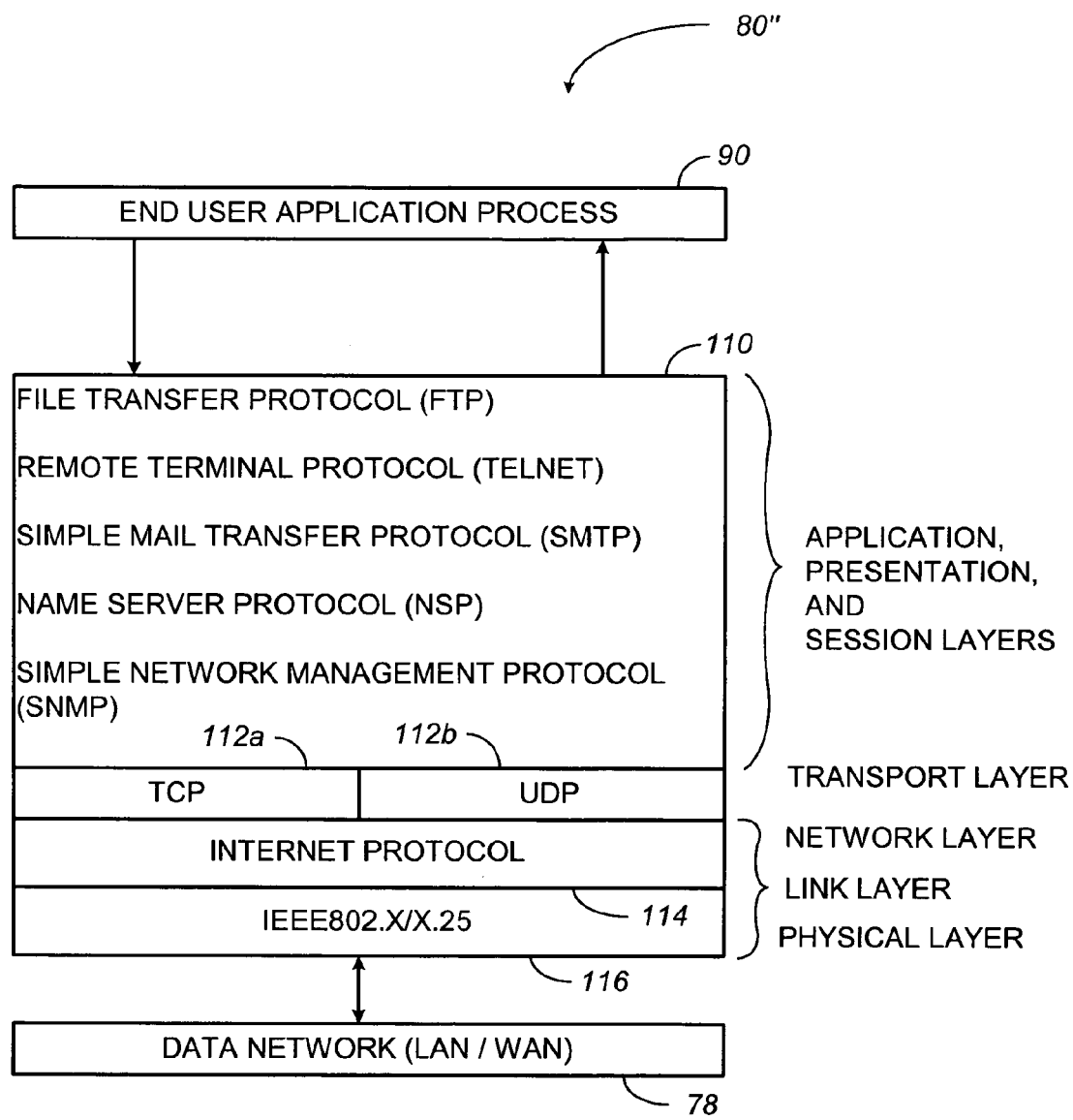
FIG. 3C is a diagram illustrating the relationship between the OSI layers and TCP/IP.

Having described both the ISO reference model for OSI with regard to FIG. 3A, and the seven protocol layers of the reference model with regard to FIG. 3B, reference is now directed to FIG. 3C. In this regard, FIG. 3C is a diagram illustrating the relationship between the seven OSI layers and the currently popular TCP/IP for data transfers between end-user application processes 90 on the Internet and private networks.

The TCP/IP suite may be summarized as illustrated in FIG. 3C. As in the OSI reference model previously described with regards to FIGS. 3A and 3B, the TCP/IP serves to enable data transfers between an end-user application process 90 operative on a first computer 80" and a remotely located computer 82 (not shown) coupled to a data network 78 herein further illustrated as either a local area network (LAN) or a wide area network (WAN). The TCP/IP includes both network-oriented protocols and application support protocols. FIG. 3C shows some of the standard protocols supported along with their relation to the seven protocol layers of the OSI reference model.

As illustrated in FIG. 3C, the file transfer protocol (FTP), the remote terminal protocol (TELNET), the simple mail transfer protocol (SMTP), the name server protocol (NSP), and the simple network management protocol (SNMP) are representative protocols provided by the TCP/IP suite 110. As is further illustrated in FIG. 3C, the aforementioned protocols relate to the application, presentation and session layers 92, 94, and 96 of the OSI reference model previously described with regards to FIGS. 3A and 3B.

As shown in FIG. 3C, a TCP 112a resides at the transport layer 100 (see FIG. 3B) of the ISO reference model along with a user datagram protocol (UDP) 112b. As further illustrated in FIG. 3C, an Internet protocol (IP) 114 resides below the transport layer 100 and relates to the lowest three levels of the ISO reference model. Below the IP 114 resides a set of joint physical connection standards herein designated as IEEE802.X/X.25 116 that define the physical interconnections for existing switched data networks 78.

It is important to note that since TCP/IP was developed concurrently with the ISO initiative to develop an OSI standard, TCP/IP does not contain specific protocols related to all of the seven OSI reference model layers. Nevertheless, most of the functionality associated with the ISO reference model layers is embedded within the suite of protocols illustrated in FIG. 3C.

Figure 4A:
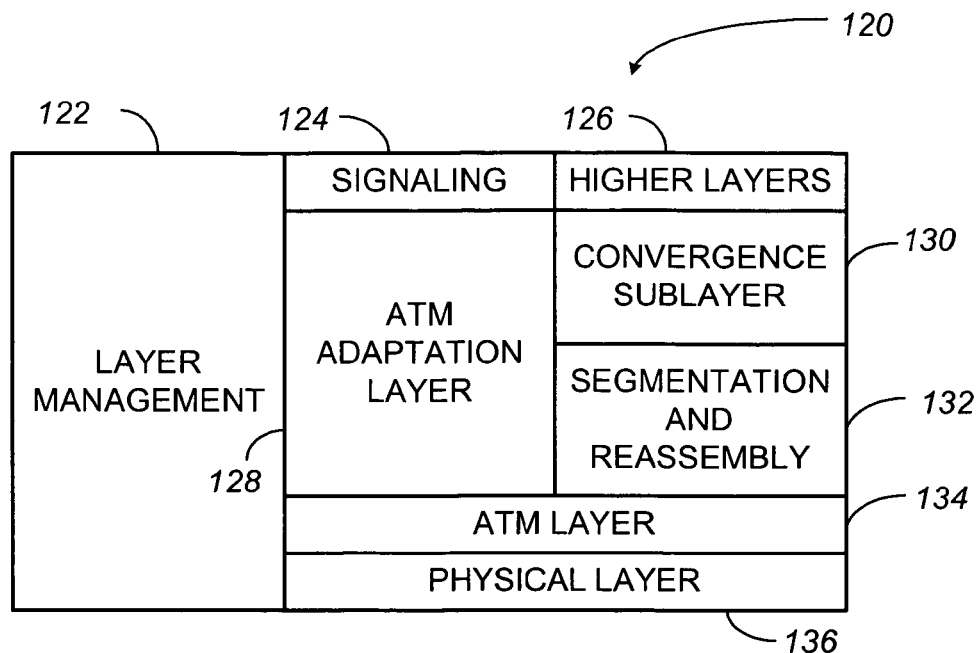
FIG. 4A is a diagram illustrating the broadband integrated services digital network (B-ISDN) protocol reference model.

Having described both the relationship between the seven ISO reference model layers with the TCP/IP suite for data transfers between end user application processes 90 on the Internet with regard to FIG. 3C, reference is now directed to FIG. 4A. FIG. 4A is a diagram illustrating a broadband integrated services digital network (B-ISDN) protocol reference model. A B-ISDN is an all purpose digital network to facilitate worldwide information exchange between any two subscribers without limitations introduced or imposed by either the medium or the data to be transferred. Asynchronous transfer mode (ATM) is the transport mode of choice for B-ISDN. ATM is a connection-oriented packet-switching technique that uses a 53-byte fixed size cell to transfer information via a network. The short packet size of ATM, at high transmission rates, offers the flexibility to provide a wide range of services required by different end-user applications. The term asynchronous indicates that the cells generated by a source may appear at irregular intervals in the network. The connection-oriented nature of ATM arises out of the need to reserve resources in the network to meet the quality of service (QoS) requirements of end-user applications.

As illustrated in FIG. 4A, the B-ISDN protocol reference model 120 comprises layer management 122, a signaling layer 124, higher layers 126, an ATM adaptation layer 128, an ATM layer 134, and a physical layer 136. The ATM adaptation layer 128, as illustrated in FIG. 4A, may be further described as comprising both a convergence sublayer 130 and a segmentation and reassembly (SAR) sublayer 132.

The signaling layer 124 and the higher layers 126 illustrated at the uppermost levels in the ATM protocol may be further described as a user layer. Thus the B-ISDN protocol reference model of FIG. 4A can be described as comprising a physical layer 136, an ATM layer 134, an ATM adaptation layer 128, and a user layer (comprising signaling 124 and higher layers 126). The physical layer 136 transports cells between two ATM entities (i.e., a first computer 80 and a remote computer 82). It guarantees, within a certain probability, the cell header integrity and merges user cells to generate a continuous bit stream across a physical transport medium. The ATM layer 134 transfers fixed size ATM cells between the users of the ATM layer 134 by preserving the cell sequence integrity. The ATM layer 134 includes the following: cell structure and encoding; message traffic control; services provided to the ATM adaptation layer 128; and services expected from the physical layer 136.

The ATM layer 134 deals with the functions of the cell header independent of the type of information carried in the cell. Thus simplicity and flexibility are achieved by omitting various services required by end-user application processes 90 (see FIGS. 3A–3C). In particular, the ATM layer 134 does not provide information on the frequency of the service clock, detection of erroneously inserted cells, detection for lost or omitted cells, means to determine and handle cell delay variation, and awareness of the content of the user information.

The main reason for not providing these services at the ATM layer 134 is that not all end-user application processes 90 (see FIG. 3C) require these services. By way of example, data traffic does not require information on the frequency of the service clock, whereas, voice encoded data may require awareness on the contents of the information. Accordingly, the functionality required by various data services are grouped into a small number of classes that are supported by different ATM adaptation layers 128.

There are four service classes, as well as, a user defined class of service. Class A corresponds to services that require a constant bit rate (CBR) connection. Class A services require timing synchronization between the source and the destination nodes. Two examples are 64 kb/s pulse code modulation (PCM) voice and CBR video. Class B corresponds to a variable bit rate (VBR) connection-oriented service. Class B services also require a timing relation between the source and the destination nodes. VBR encoded video is an example of a data service which falls into the B service class. Class C corresponds to VBR connection-oriented service with no timing relation between the source and the destination node. A typical service within the C service class is a connection-oriented data transfer. Class D corresponds to a VBR connectionless service with no timing relation between the source and the destination node. Connectionless data transfer between two LANs over a WAN, such as the Internet, is an example of a class D type service. Class X service is a raw cell service to allow for proprietary vendor-defined ATM adaptation layers 128.

As introduced herein above, the ATM adaptation layer 128 further comprises a convergence sublayer (CS) 130 and a segmentation and reassembly (SAR) sublayer 132. A transmit node SAR sublayer 132 receives CS-protocol data units (CS-PDUs) and segments them, or collects in the case of CBR services, so that when a SAR header/trailer is added to the PDU, the final payload fits into one ATM payload portion of 48 bytes. On the receiving end, the SAR sublayer 132 reconstructs the CS-PDUs from received cells and passes them to the CS sublayer 130. The CS sublayer 130 is further divided into a common portion and a service specific portion (not shown). The common portion of the CS sublayer 130 performs functions common to a particular ATM adaptation layer 128 class of users. The service specific requirements of different classes of users, for example, timing recovery for real-time applications, are implemented in the service specific portion of the CS sublayer 130. For services that do not require any specific function, the service specific portion may be null.

CBR services in the ATM framework are assumed to require a timing relationship between the end nodes. VBR services, on the other hand, are further classified into two subcategories depending upon whether an end-to-end timing relationship is required. The former classification is intended for applications such as VBR video and audio. The latter classification is for data services. These data-service applications may be further classified based on those that require a connection-oriented data transfer and those that transfer data via a connectionless application service.

Figure 4B:
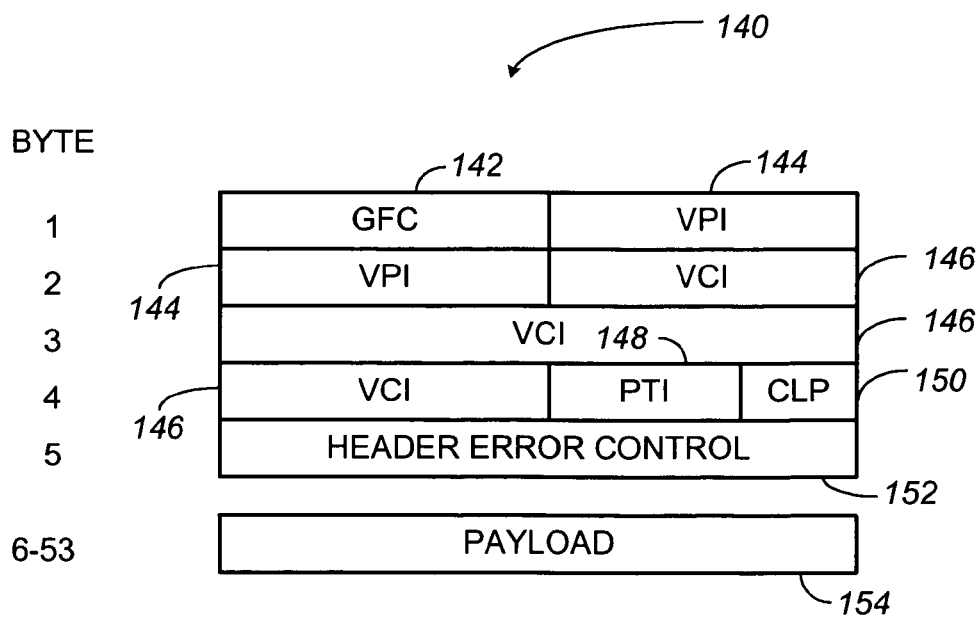
FIG. 4B is a diagram illustrating the cell format of a transmission mode of choice, asynchronous transfer mode (ATM), in B-ISDNs.

Having described the B-ISDN protocol as illustrated in FIG. 4A, along with ATM layers and service classes, reference is now directed to FIG. 4B. In this regard, FIG. 4B illustrates the ATM cell format. As illustrated in FIG. 4B, an ATM cell 140 comprises 53 bytes, with the first five bytes forming a cell header and the remaining 48 bytes a payload 154. As further illustrated in FIG. 4B, the ATM cell header comprises a first byte consisting of two fields, a generic flow control (GFC) field 142 and a virtual path identifier (VPI) 144. The second byte of the ATM cell header also contains two fields, a second portion of the VPI and a first portion of a virtual channel identifier (VCI) field 146. The third byte of the ATM cell header comprises a second portion of the VCI 146. The fourth byte of the ATM cell header comprises a third portion of the VCI 146, a payload type identifier (PTI) field 148, and a cell loss priority (CLP) field 150. The fifth and last byte of the ATM cell header comprises a header error control field 152.

The GFC field 142 is a 4-bit field providing flow control and fairness at a user-network interface. It is not used to control data traffic in the other direction, that is, network to user traffic flow. The GFC field 142 has no use within the network and is intended for use by access mechanisms that implement different access levels and priorities.

ATM data transfers require established connections prior to initiating and completing a data transfer. ATM uses routing tables at each node along the path of a connection that map the connection identifiers from the incoming links to the outgoing links. There are two levels of routing hierarchies, virtual paths (VPs) and virtual channels (VCs). A VC uses a unique identifier used to describe the unidirectional transport of cells from one end user to a remotely located end user (i.e., a first computer 80 and a remote computer 82). A VP is a collection of one or more VCs between two nodes. Each VP has a bandwidth associated with it limiting the number of VCs that can be multiplexed on the VP. VPIs are used to route packets between two nodes that originate, remove, or terminate the VPs, whereas, VCIs are used at these end nodes to distinguish between individual connections. It is significant to note that there is no difference between a VP and a VC when a VP is defined over a single physical link. When a VP is defined over two or more physical links, it reduces the size of the routing tables by allowing a number of VCs to be switched based upon a single identifier, that is, a VPI 144.

The PTI field 148 defines what is transmitted in the cell payload. The CLP field 150 of the ATM cell header is a 1-bit field that provides limited flexibility by defining two cell-loss priorities. The header error control field 152 is used mainly to discard cells with corrupted headers and to delineate cells. Where cell delineation is the process of determining the cell boundaries from the received bit stream. The 8-bit field provides single-bit error correction and a low probability of corrupted cell delivery capabilities.

A possible end-to-end model for data communications using a xDSL data transfer medium, where xDSL is an acronym designated to encompass the group consisting of but not limited to ADSL, RADSL, integrated services digital network DSL (IDSL), multi-rate symmetric DSL (MSDSL), HDSL, HDSL2, and further including discrete multi-tone heavy (DMT.heavy) and DMT-G.Lite may consist of TCP/IP running on top of PPP, which may run on top of ATM. The QoS and VC flexibility inherent in ATM permits a single user access to many different data sources simultaneously. By way of example, a single user may surf the net, download a software application, listen to a web radio station, and check corporate Email by accessing a virtual private network. Ideally, a single user could have multiple open "windows" or active applications each of which may be connected to a separate VC with each of the aforementioned data services received and transmitted via logically separate data streams through the xDSL interface to a remote device.

Figure 5:
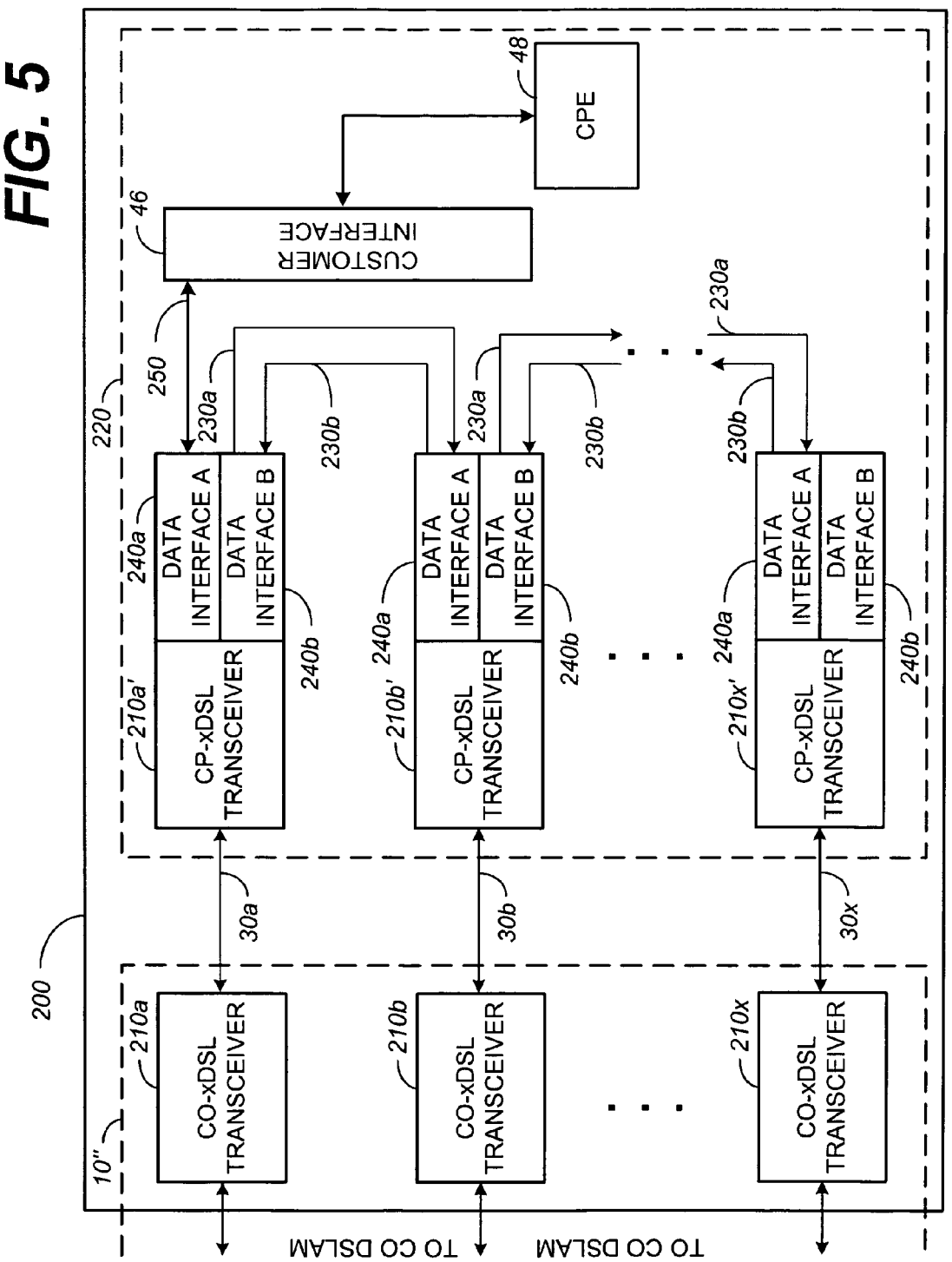
FIG. 5 is a functional block diagram of a first embodiment of the multi-channel DSL communication link in accordance with the present invention.

Turning now to the drawings focusing on illustrating the hardware portion of the present invention, wherein like reference numerals designate corresponding parts throughout the drawings, FIG. 5 is a functional block diagram illustrating a preferred embodiment of a multi-channel DSL communication link in accordance with the present invention.

As illustrated in FIG. 5, a multi-channel DSL communication link 200 in accordance with the present invention may comprise a plurality of equipment located within a CO 10", a plurality of twisted pair telephone transmission lines 30, and a plurality of equipment located within a CP 220. As is further illustrated in FIG. 5, CO-xDSL transceivers 210a, 210b, . . . , 210x may be coupled via the plurality of twisted pair telephone transmission lines 30a, 30b, . . . , 30x to a plurality of CP-xDSL transceivers 210a', 210b', . . . , 210x' each having a first data interface 240a, herein labeled, "Data Interface A" and a second data interface 240b, herein labeled, "Data Interface B." The multi-channel DSL communication link 200 may further comprise a plurality of data transmission links 230a configured to couple the second data interfaces 240b of a CP-xDSL transceivers 210' nearest the customer interface 46 with a first data interface 240a of the next furthest CP-xDSL transceiver 210' from the customer interface 46. It is significant to note that the various data transmission links 230a may serve to enable upstream data transfers across the multi-channel DSL communication link 200. As is further illustrated in FIG. 5, the multi-channel DSL communication link 200 may further comprise a plurality of data transmission links 230b configured to couple the first data interface 240a of the furthest CP-xDSL transceiver 210' with the second data interface 240b of the next closest CP-xDSL transceiver 210' from the customer interface. It is significant to note that the various data transmission links 230b may serve to enable downstream data transfers across the multi-channel DSL communication link 200.

As further illustrated in FIG. 5, a first of the plurality of CP-xDSL transceivers 210a' may have a first data interface 240a that may be coupled via a data transmission link 250 to a customer interface 46. As is also illustrated in FIG. 5, the multi-channel DSL communication link 200 may terminate at CPE 48 having been coupled to the plurality of DSL channels via the customer interface 46. As is also illustrated in FIG. 5, a last of the plurality of CP-xDSL transceivers 210x' may have a second data interface 240b that may simply be unused by the multi-channel DSL communication link 200. Alternatively, the CP-xDSL transceiver 210x' may simply be configured with a first data interface 240a.

As illustrated in FIG. 5, a multi-channel DSL communication link 200 in accordance with the present invention may use a plurality of data transmission links 230 interconnecting a plurality of data interfaces 240 to configure a plurality of CP-xDSL transceivers 210' in a daisy-chain configuration at a CP 220 to increase the data rate and or communication link reach between a CO 10" and a remote CP 220. The plurality of CP-xDSL 210' to CP-xDSL 210' data transmission links 230 may be implemented through a set of bi-directional full-duplex data connections. As illustrated, the data transmission daisy-chain interface may comprise independent data interfaces in the upstream and downstream data transmission directions and may therefore support independent data rates for upstream and downstream data transfers.

The original data stream, herein represented by the previously mapped CO-DSLAM inputs (three shown), each dedicated to a respective xDSL channel formed by a xDSL transceiver pair and communicated via a twisted pair telephone line 30, may be transmitted from a CO10" and recovered and reorganized at a CP 220 via the daisy-chained xDSL transceivers 210' as follows. A first CP-xDSL transceiver 210a may be coupled to CPE 48 via the customer interface 46, a data transmission link 250, and the first data interface 240a. In order to support both upstream (CP 220 to CO 10") and downstream (CO 10" to CP 220) xDSL data transmissions, the data transmission link 250 may comprise one or more distinct data interfaces capable of supporting xDSL data stream transmissions in both the upstream and downstream data transfer directions. It is important to note that preferred embodiments of a multi-channel DSL communication link 200 in accordance with the present invention may multiplex each of the individual xDSL data streams received at each of the plurality of CP-xDSL transceivers 210', such that a composite downstream xDSL data stream communicated across the data transmission link 250 comprises a recovered and reconstructed representation of an original xDSL data stream that may have been mapped (i.e., inverse multiplexed) at a CO 10".

Alternatively, a composite downstream xDSL data stream communicated across the data transmission link 250 may rely on the customer interface 46 to reconstruct the original xDSL data stream. Those skilled in the art will appreciate that the original xDSL data stream may be reconstructed within a customer interface 46 using a router, a multiplexer, or any of a number of similar devices. Those skilled in the art will further appreciate that that the customer interface 46 may coordinate internal hardware, firmware, and software separately or in various combinations in order to reconstruct the original xDSL data stream. Those skilled in the art will also appreciate that the customer interface 46 implementation may vary based on a selected data transfer protocol for CP-xDSL 210' to CP-xDSL 210' data transfers.

It is important to note that in preferred embodiments, the plurality of data interfaces 240 may accomplish data communication between the various CP-xDSL transceivers 210' via serial data transfers. Serial data interfaces 240 currently provide an economical solution for xDSL line bonding. While parallel data interfaces may be used to accomplish xDSL line bonding, relatively low maximum xDSL data rates (i.e., <10 Mbits/sec.) may render a parallel interface quite inefficient. In addition, parallel data interfaces may necessitate an increase in the number of data input and output pins and may increase the required data routing space within each of the CP-xDSL transceivers 210'. Those skilled in the art will appreciate that the serial versus parallel data transfer trade-offs may weigh more heavily in the favor of using parallel data interfaces as maximum xDSL data rates increase.

In preferred embodiments, a data transfer clock between any two CP-xDSL transceivers 210' for both upstream and downstream data transfers may be driven by the CP-xDSL transceiver 210x'. By way of example, referring to FIG. 5 with CP-xDSL transceiver 210x' being the last DSL transceiver in the daisy-chain, data transfers for the data transmission links 230a and 230b between CP-xDSL transceiver 210x' and CP-xDSL transceiver 210b' (assuming it is the next closest DSL transceiver to the customer interface 46 in the daisy-chain) may be derived from the DSL data transfer rate between CO-xDSL transceiver 210x and CP-xDSL transceiver 210x'. As a result data transfer rate negotiation between each of the various data interfaces 240 may be avoided. Using this data transfer clock selection, CP-xDSL transceiver 210x' may set the data transfer clock for receiving upstream data according to the upstream DSL data rate for the CO-xDSL transceiver 210 CP-xDSL transceiver 210x' pair. Similarly, CP-xDSL transceiver 210x' may set the data transfer clock for sending downstream data according to the downstream DSL data rate for the CO-xDSL transceiver 210 CP-xDSL transceiver 210x' pair.

In the case of CP-xDSL transceiver 210b', the data transfer clock rate for upstream data may already be set by CP-xDSL transceiver 210x'. As a result, CP-xDSL transceiver 210b' may only need to provide data transfer clock rates for send and receive data transmissions with CP-xDSL transceiver 210a'. As with CP-xDSL transceiver 210x', the CP-xDSL transceiver 210b' may accomplish this based on the upstream and downstream DSL data rates between CO-xDSL transceiver 210b and CP-xDSL transceiver 210b'. It is important to note that both the upstream and the downstream data transfer clock rates may be communicated across the data transmission links 230a and 230b without burdening an external processor.

In the case of CP-xDSL transceiver 210a', the data transfer clock rate for upstream data may have already been set by CP-xDSL transceiver 210b'. As a result, CP-xDSL transceiver 210a' may only need to provide a data transfer clock rate for data transfers to and from the customer interface 46. It is important to note that the downstream data transfer clock rate may be set by the customer interface 46, or alternatively, the data transfer clock rate for downstream data transmissions may be determined through a combination of the downstream data transfer rate between CP-xDSL 210a' and CP-xDSL 210b' and or the DSL data rate between CO-xDSL 210a and CP-xDSL 210a'.

CP-xDSL Transceiver to CP-xDSL Transceiver Data Transfer Protocols

A number of possible data transfer protocols may be used to realize a multi-channel DSL communications link 200 in accordance with the present invention. One non-limiting option is to operate the various CP-xDSL transceiver 210 to CP-DSL transceiver 210' data transmissions under a pulse coded modulation (PCM) based protocol, using identified time slots for both xDSL data transfers between the CO-xDSL transceivers 210 and the CP-xDSL transceivers 210' and other identified time slots for CP-xDSL 210' to CP-xDSL 210' data transfers. In this case, a frame synchronization signal may be added to each data transmission link 230 in order to significantly reduce the complexity and workload of the various CP-xDSL transceivers 210'. As the need for a more robust PCM frame synchronization such as that described in standard G.704 would not be required. It is significant to note however that a PCM based protocol may not be a good selection in the case of xDSL systems that comprise a data payload (i.e., ADSL systems). In the case of ADSL systems, the data payload is not organized in time slots of a predetermined number of bits having a predetermined frame rate as may be expected with a PCM implementation. In the case of ADSL systems, forcing the data to be transferred between each of the various CP-xDSL transceivers 210' into a PCM type of data transmission would significantly increase the protocol overhead and the complexity of a related protocol-handling engine.

In the case of ATM based xDSL applications, the CO-xDSL transceivers 210 may transfer data between corresponding CP-xDSL transceivers 210' using a data stream comprising a serial ATM cell stream, where each ATM cell is followed by the next ATM cell. In the case of missing data or when the xDSL data transfer rate is greater than the effective ATM payload rate, ATM idle cells may be inserted to maintain ATM cell synchronization. In the case of a system such as the multi-channel DSL communication link 200 illustrated in FIG. 5, CP-xDSL transceiver 210$x$' may send the received xDSL payload over the data transmission link 230 to CP-xDSL transceiver 210$b$'. If the data transfer rate from CP-xDSL transceiver 210$x$' to CP-xDSL transceiver 210$b$' is selected slightly higher than the xDSL downstream data transfer rate at CP-xDSL 210$x$', then the channel has additional capacity to accommodate direct communication from CP-xDSL transceiver 210$x$' to CP-xDSL transceiver 210$b$' for data management.

By way of example, CP-xDSL transceiver 210$x$' may generate and insert additional ATM cells into the data stream. The additional ATM cells may contain information regarding the operational status of CP-xDSL transceiver 210$x$', the upstream and downstream data transfer rates, the DSL line rate, and other variables of interest. CP-xDSL transceiver 210$b$' may be configured to detect and process the non-payload cells based on the associated ATM cell header. Similarly, each of the CP-xDSL transceivers in the daisy-chain may communicate in order to coordinate the various data transmissions.

A device that is communicating with the CPE 48 via the customer interface 46, such as the CP-xDSL transceiver 210$a$' may have the responsibility of concatenating downstream data that it is receiving from the CO-xDSL transceiver 210$a$ along with data that may be incoming through the second data interface 240$b$ from a next furthest CP-xDSL transceiver 210$b$' from the customer interface 46. In the upstream direction, the CP-xDSL transceiver 210$a$' may receive upstream data from the customer interface 46 at a rate faster than the DSL link comprising the CP-xDSL transceiver 210$a$', the twisted-pair telephone transmission line 30$a$, and the CO-xDSL transceiver 210$a$ can transfer the data. If this is the case, the CP-xDSL transceiver 210$a$' may have the responsibility of removing that portion of the upstream data stream that it can transfer over the DSL link. The remaining portion of the upstream data may then be serialized and forwarded to the remaining CP-xDSL transceivers 210' via the various data transmission links 230 as required to support the transmission of the entire upstream data stream.

Figure 6:
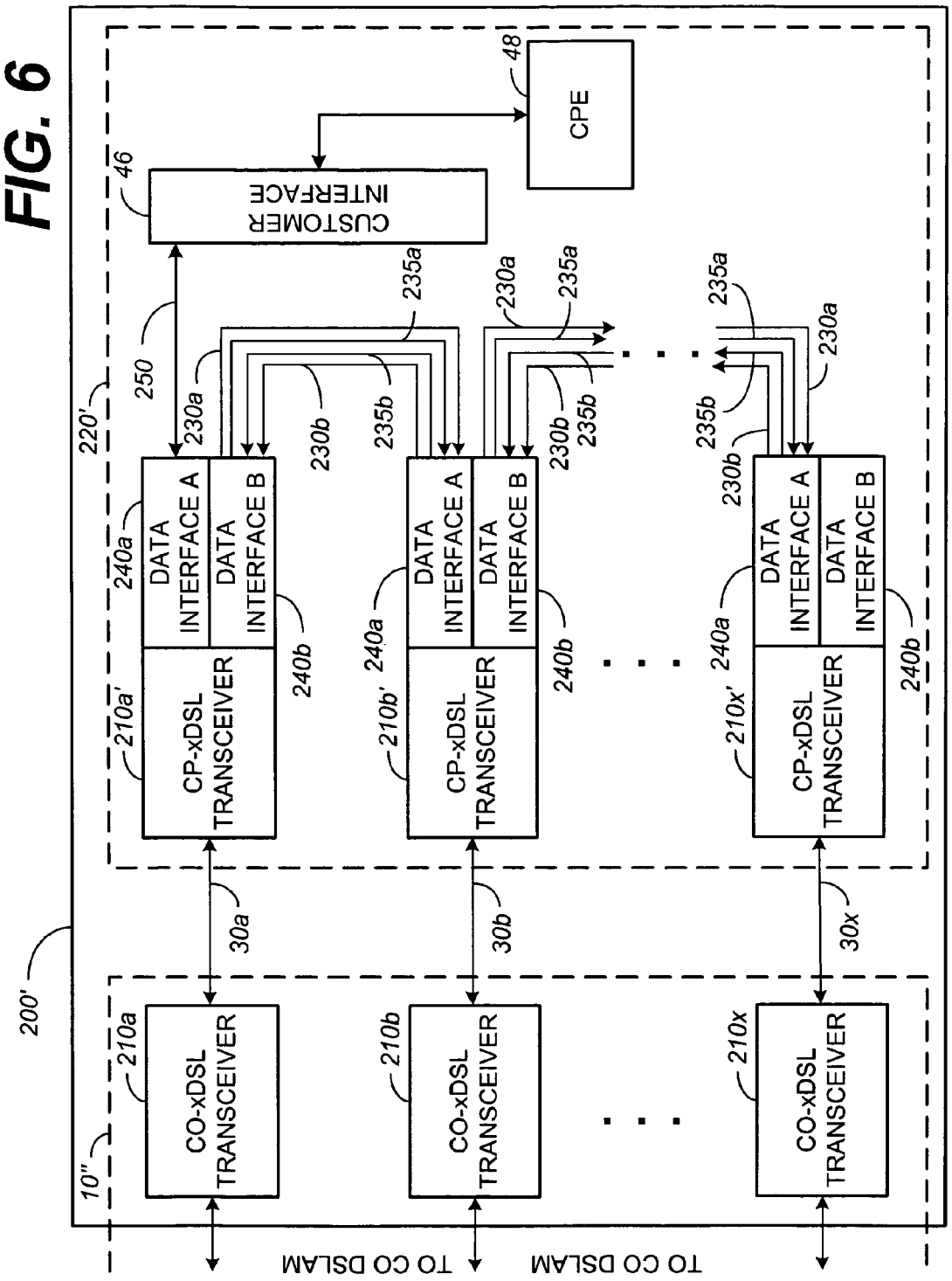
FIG. 6 is a functional block diagram of an alternative embodiment of a multi-channel DSL communication link in accordance with the present invention.

Having introduced and described the operation of a first preferred embodiment of a multi-channel DSL communication link 200 with regard to FIG. 5, reference is now directed to FIG. 6. In this regard, FIG. 6 is a functional block diagram illustrating an alternative embodiment of a multi-channel DSL communication link 200' in accordance with the present invention.

As illustrated in FIG. 6, a multi-channel DSL communication link 200' in accordance with the present invention may comprise a plurality of equipment located within a CO 10", a plurality of twisted pair telephone transmission lines 30, and a plurality of equipment located within a CP 220'. As is further illustrated in FIG. 6, a multi-channel DSL communication link 200' in accordance with the present invention may comprise a plurality of CO-xDSL transceivers 210$a$, 210$b$, . . . , 210$x$ coupled via a plurality of twisted pair telephone transmission lines 30$a$, 30$b$, . . . , 30$x$ to a plurality of CP-xDSL transceivers 210$a$', 210$b$', . . . , 210$x$' each having a first data interface 240$a$, herein labeled, "Data Interface A" and a second data interface 240$b$, herein labeled, "Data Interface B." The multi-channel DSL communication link 200' may further comprise a plurality of data transmission links 230$a$ configured to couple the second data interfaces 240$b$ of a CP-xDSL transceivers 210' nearest the customer interface 46 with a first data interface 240$a$ of the next furthest CP-xDSL transceiver 210' from the customer interface 46. It is significant to note that the various data transmission links 230$a$ may serve to enable upstream data transfers across the multi-channel DSL communication link 200'.

As further illustrated in FIG. 6, the multi-channel DSL communication link 200' may further comprise a plurality of data transmission links 230$b$ configured to couple the first data interface 240$a$ of the furthest CP-xDSL transceiver 210' with the second data interface 240$b$ of the next closest CP-xDSL transceiver 210' from the customer interface. It is significant to note that the various data transmission links 230$b$ may serve to enable downstream data transfers across the multi-channel DSL communication link 200. In accordance with the alternative embodiment of a multi-channel DSL communication link 200' illustrated in FIG. 6, each of the various CP-xDSL transceivers 210' may be further coupled with an ATM cell synchronization signal 235 operative in parallel and co-directional with each of the plurality of data transmission links 230 coupling each of the plurality of CP-xDSL transceivers 210' in the daisy-chain.

As also illustrated in FIG. 6, a first of the plurality of CP-xDSL transceivers 210$a$' may have a first data interface 240$a$ that may be coupled via a data transmission link 250 to a customer interface 46. As is also illustrated in FIG. 6, the multi-channel DSL communication link 200' may terminate at CPE 48 having been coupled to the plurality of DSL channels via the customer interface 46. As is also illustrated in FIG. 6, a last of the plurality of CP-xDSL transceivers 210$x$' may have a second data interface 240$b$ that may simply be unused by the multi-channel DSL communication link 200'. Alternatively, the CP-xDSL transceiver 210$x$' may simply be configured with a first data interface 240$a$.

The ATM cell synchronization signals 235 introduced in the alternative embodiment of the multi-channel DSL communication link 200' illustrated in FIG. 6 may significantly reduce the complexity of the protocol handler on the receiving end of each of the various upstream and downstream data transmissions, as header error check (HEC) computations and HEC-based ATM cell synchronization may be required. The ATM cell synchronization signals 235 may be configured to simply provide a rising or a falling edge signal synchronized with the first bit of each new ATM cell.

It is significant to note that the configurations introduced with regard to FIGS. 5 & 6 above illustrating the combination of multiple DSL transceivers 210 to increase the data rate or extend the reach of a multi-channel DSL communications link 200' may be applied at a CO 10. Those skilled in the art will appreciate that there are other ways to combine multiple data streams at the CO 10. However, if a system and method in accordance with the present invention is implemented within an application specific integrated circuit (ASIC) in order to bond a plurality of DSL data streams at a CO 10, the various DSL data streams could be combined internal to the ASIC device. As a result, the plurality of DSL data streams would not have to traverse ASIC pins until after the DSL data stream aggregation has been performed. A multi-channel DSL device operative at a CO 10 could essentially concatenate M DSL lines and introduce the associated data traffic to the CO 10 backplane through a single interface, thus saving integrated circuit board space.

Figure 7:
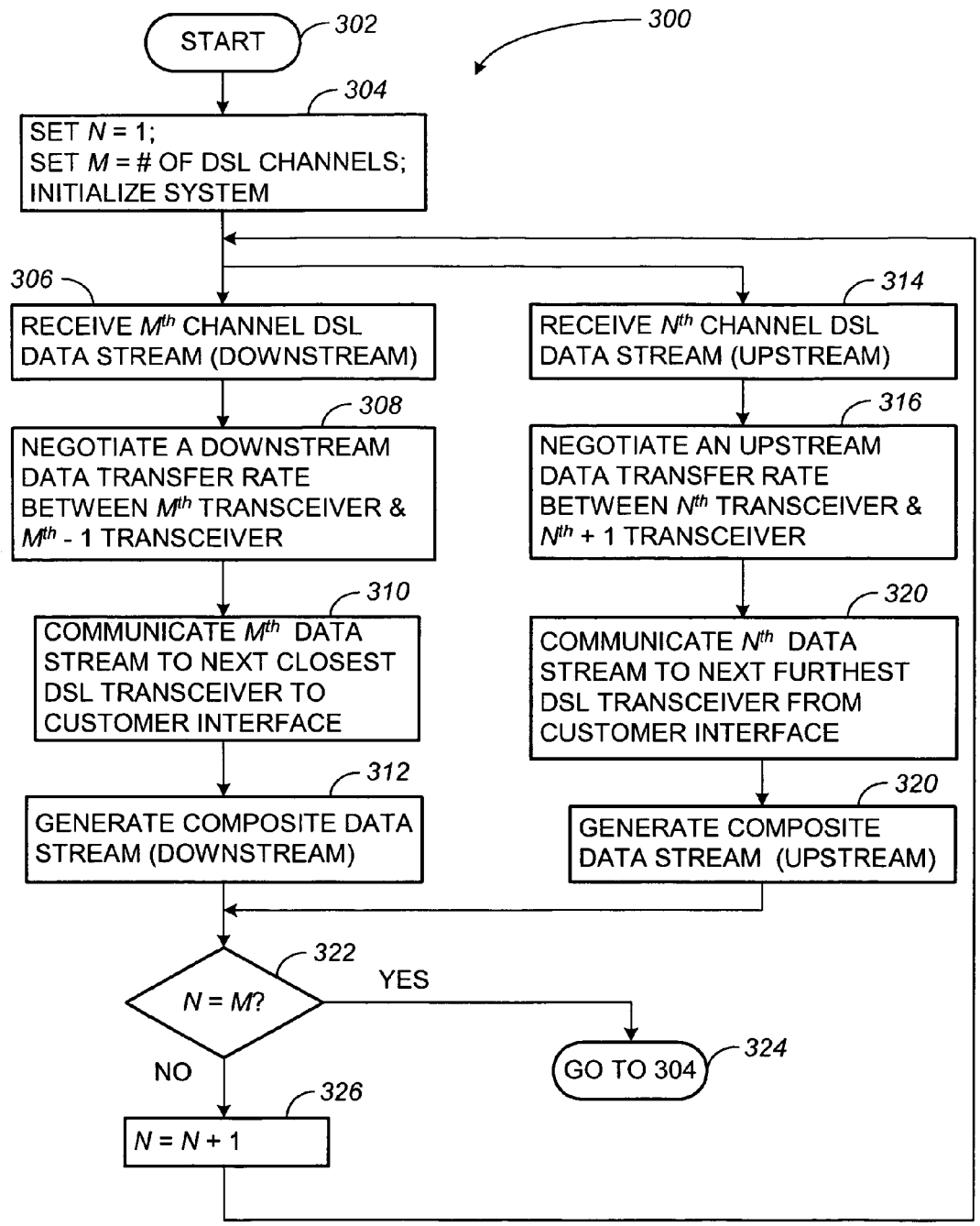
FIG. 7 is a flow chart illustrating a preferred method for transferring data between multiple DSL transceivers at a customer premise that may be implemented by either of the preferred embodiments of the multi-channel DSL communication link introduced in FIGS. 5 and 6.

Having introduced and described an alternative preferred embodiment of the multi-channel DSL communications link 200' in accordance with the present invention with regard to FIG. 6, reference is now directed to FIG. 7, which introduces a flowchart illustrating a method for transferring data between multiple DSL transceivers at a customer premise.

As illustrated in FIG. 7, a method for transferring data between multiple DSL transceivers at a customer premise 300 may begin with step 302, herein designated as "start." Next, in step 304, the method for transferring data between multiple DSL transceivers at a customer premise 300 may set a first variable, N to 1; a second variable M to the number of DSL transceivers; and the DSL communication system may be initialized. The method for transferring data between multiple DSL transceivers at a customer premise 300 may proceed with parallel downstream channel (left branch) and upstream channel (right branch) processing steps as illustrated in FIG. 7. Downstream channel processing may continue with step 306 where a $M^{th}$ downstream DSL data channel may be received. As further illustrated in step 308, the method may negotiate a downstream data transfer rate between the $M^{th}$ DSL transceiver and the $M^{th}-1$ DSL transceiver in the daisy-chain (see FIGS. 5 and 6). Next, in step 310, the method may communicate the $M^{th}$ data stream to the DSL transceiver next closest to the customer interface 46 (see FIGS. 5 and 6). In step 312, the $M^{th}-1$ DSL transceiver may generate a composite data stream representing the combination of the $M^{th}$ and the $M^{th}-1$ downstream data streams.

While the method for transferring data between multiple DSL transceivers at a customer premise 300 is performing the downstream (left branch) processing steps (306–312), the method may be simultaneously performing upstream (right branch) processing steps (314–320) as will be further described below. In this regard, upstream DSL data channel processing may proceed with step 314 where a $N^{th}$ upstream DSL data channel may be received. As further illustrated in step 316, the method may negotiate an upstream data transfer rate between the $N^{th}$ DSL transceiver and the $N^{th}+1$ DSL transceiver in the daisy-chain (see FIGS. 5 and 6). Next, in step 318, the method may communicate the $N^{th}$ data stream to the DSL transceiver next furthest from the customer interface 46 (see FIGS. 5 and 6). In step 320, the $N^{th}+1$ DSL transceiver may generate a composite data stream representing the combination of the $N^{th}$ and the $N^{th}+1$ upstream data streams.

As further illustrated in FIG. 7, the downstream processing (left branch) and the upstream processing (right branch) of the method for transferring data between multiple DSL transceivers at a customer premise 300 may rejoin and continue with step 322, where a determination may be performed to verify if all the multiple DSL data channels have been processed. If the determination in step 322 is affirmative, the method for transferring data between multiple DSL transceivers at a customer premise 300 may jump back to step 304 as illustrated in step 324. Otherwise, the variable N may be incremented by one as shown in step 326 and processing of the remaining upstream and downstream DSL data channels across the various DSL transceivers (see FIGS. 5 and 6) may continue as illustrated until all M DSL data channels traversing the various DSL transceivers have been processed.

Any process descriptions or blocks in the flow chart of FIG. 7 should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It will be appreciated by those skilled in the art that the multi-channel DSL communication link of the present invention can be implemented in hardware, software, firmware, or a combination thereof. In the preferred embodiment(s), the multi-channel DSL communication link is implemented in software or firmware that is stored in a memory and that is executed by a suitable instruction execution system within each of the various CP-xDSL transceivers $210x'$. If implemented in hardware, as in an alternative embodiment, the multi-channel DSL communication link can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

The invention claimed is:

1. A multiple digital subscriber line (DSL) communication system, comprising:
    a customer interface configured to supply an upstream data transmission and receive a downstream data transmission; and
    a plurality of DSL transceivers in communication with the customer interface via a first data transmission link, the plurality of DSL transceivers in communication with a respective DSL transceiver at a central office via respective transmission lines, wherein each of the plurality of DSL transceivers is configured to receive a downstream data stream and to transmit an upstream data stream, the upstream data transmission configured for distribution across the plurality of DSL transceivers, the plurality of DSL transceivers further configured to generate the downstream data transmission from a plurality of downstream data streams, the plurality of DSL transceivers in communication with each other via a plurality of DSL transceiver data transmission links, wherein each of the plurality of DSL transceivers is in communication with a first data interface and a second data interface, the first data interface interposed between an associated DSL transceiver and the plurality of DSL transceiver data transmission links with a next closest DSL transceiver to the customer interface and configured to receive an upstream data stream from the next closest DSL transceiver to the customer interface, the second data interface interposed between an associated DSL transceiver and the plurality of DSL transceiver data transmission links with a next furthest DSL transceiver to the customer interface and configured to receive a downstream data stream from the next furthest DSL transceiver from the customer interface.

2. The multiple DSL communication system of claim 1, wherein the plurality of DSL transceivers is configured to generate the upstream data transmission from a plurality of upstream data streams.

3. The multiple DSL communications system of claim 1, wherein the first and second data interfaces associated with each of the plurality of DSL transceivers comprise serial data interfaces.

4. The multiple DSL communications system of claim 1, wherein the first and second data interfaces associated with each of the plurality of DSL transceivers comprise bi-directional data interfaces.

5. The multiple DSL communications system of claim 1, wherein the first and second data interfaces associated with each of the plurality of DSL transceivers comprise independent data interfaces.

6. The multiple DSL communications system of claim 5, wherein the first and second data interfaces between a first DSL transceiver closest to the customer interface and a second DSL transceiver next closest to the customer interface respectively operate at an upstream data rate set by the first DSL transceiver closest to the customer interface, and wherein additional next closest DSL transceiver from the customer interface operate at an upstream data rate set by the first DSL transceiver closest to the customer interface, respectively.

7. The multiple DSL communication system of claim 5, wherein the first and second data interfaces between a last DSL transceiver furthest from the customer interface and a next closest DSL transceiver closer to the customer interface operate at a downstream data rate set by the last DSL transceiver furthest from the customer interface and wherein subsequently closer DSL transceiver to the customer interface operate at a downstream data rate set by the last DSL transceiver furthest from the customer interface, respectively.

8. The multiple DSL communication system of claim 5, wherein DSL transceiver data transmissions are performed via a pulse coded modulation (PCM) data transfer protocol.

9. The multiple DSL communication system of claim 5, wherein DSL transceiver data transmissions are performed via an asynchronous transfer mode (ATM) data transfer protocol.

10. The multiple DSL communication system of claim 9, further comprising:
an ATM cell synchronization signal operative in parallel and co-directional with each of the plurality of DSL transceiver data transmission links.

11. The multiple DSL communication system of claim 10, wherein the ATM cell synchronization signal is configured to identify an ATM cell header.

12. A multiple digital subscriber line (DSL) communication system, comprising:
means for communicating with a customer premises equipment to receive an upstream data transmission;
means for distributing a portion of the received upstream data transmission to each of a plurality of DSL communication links for transmission via a plurality of serially connected DSL transceivers in communication with each other;
means for receiving a portion of a downstream data transmission distributed across each of the plurality of DSL communication links;
means for combining the portions of the downstream data transmission such that the downstream data transmission is reconstructed via the plurality of serially connected DSL transceivers in communication with each other;
means for configuring the rate of the upstream and downstream data transmissions being driven by the last DSL transceiver that is farthest from a customer interface of the customer premise equipment, with the rate of the upstream and downstream data transmissions between two previous DSL transceivers being derived from the rate of the upstream and downstream data transmissions of a subsequent DSL transceiver; and
means for communicating a reconstructed downstream data transmission to the customer premises equipment.

13. The multiple DSL communication system of claim 12, wherein the means for receiving the portion of the downstream data transmission is accomplished via a plurality of DSL transceivers dedicated to receive the portion of the downstream data transmission from a predetermined remote DSL transceiver.

14. The multiple DSL communication system of claim 12, wherein the plurality of serially connected DSL transceivers are in further communication with a first data interface and a second data interface interposed in a communication link between the serially connected DSL transceivers.

15. A method for transferring data between multiple DSL transceivers at a customer premise, comprising:
recovering a mapped portion of a downstream data stream at each of the multiple DSL transceivers; using a first data interface coupled to each respective DSL transceiver to communicate the recovered mapped portion of the downstream data stream to the next closest DSL transceiver to a customer interface of the customer premise;
mapping an upstream data stream such that a portion of the upstream data stream is designated for transmission by each of the multiple DSL transceivers; and
using a second data interface coupled to each respective DSL transceiver to communicate mapped portions of the upstream data stream to the next furthest DSL transceiver from the customer interface.

16. The method of claim 15, wherein the first data interface coupled to each DSL transceiver is configured to communicate portions of the downstream data stream to the second data interface of the next closest DSL transceiver to the customer interface.

17. The method of claim 15, wherein the second data interface coupled to each DSL transceiver is configured to communicate with the first data interface of the next furthest DSL transceiver from the customer interface.

18. The method of claim 15, wherein the first and second data interfaces comprise serial data interfaces.

19. The method of claim 15, wherein the first and second data interfaces comprise bi-directional data interfaces.

20. The method of claim 15, wherein the first and second data interfaces comprise independent data interfaces.

21. The method of claim 15, wherein DSL transceiver communications are performed via a data transfer protocol.

22. The method of claim 21, wherein the data transfer protocol is accomplished with a pulse-code modulation (PCM) protocol.

23. The method of claim 21, wherein the data transfer protocol is accomplished with an asynchronous transfer mode (ATM) protocol.

24. The method of claim 15, further comprising:
   identifying the mapped portions of the upstream data stream designated for transmission at each of the multiple DSL transceivers; and
   transmitting the mapped portion.

25. The method of claim 15, further comprising:
   reconstructing the recovered portion of the downstream data stream at each of the multiple DSL transceivers; and
   communicating the reconstructed downstream data stream to the customer interface.

26. A multiple digital subscriber line (DSL) communication system, comprising:
   a central office interface configured to receive an upstream data transmission and supply a downstream data transmission; and
   a plurality of DSL transceivers in communication with the central office interface via a first data transmission link, the plurality of DSL transceivers in communication with a respective DSL transceiver at a customer premise via respective transmission lines, wherein each of the plurality of DSL transceivers is configured to receive an upstream data stream and to transmit a downstream data stream, the downstream data transmission configured for distribution across the plurality of DSL transceivers, the plurality of DSL transceivers further configured to generate the upstream data transmission from a plurality of upstream data streams, the plurality of DSL transceivers in communication with each other via a plurality of DSL transceiver data transmission links,
   wherein each of the plurality of DSL transceivers is in communication with a first data interface and a second data interface, the first data interface interposed between an associated DSL transceiver and the plurality of DSL transceiver data transmission links with a next closest DSL transceiver to the central office interface and configured to receive a downstream data stream from the next closest DSL transceiver to the central office interface, the second data interface interposed between an associated DSL transceiver and the plurality of DSL transceiver data transmission links with a next furthest DSL transceiver to the central office interface and configured to receive an upstream data stream from the next furthest DSL transceiver from a customer interface.

27. The multiple DSL communication system of claim 26, wherein the plurality of DSL transceivers is configured to generate the downstream data transmission from the plurality of downstream data streams.

28. The multiple DSL communication system of claim 26, wherein the first and second data interfaces associated with each of the plurality of DSL transceivers comprise serial data interfaces.

29. The multiple DSL communication system of claim 26, wherein the first and second data interfaces associated with each of the plurality of DSL transceivers comprise bi-directional data interfaces.

30. The multiple DSL communication system of claim 26, wherein the first and second data interfaces associated with each of the plurality of DSL transceivers comprise independent data interfaces.

31. The multiple DSL communication system of claim 30, wherein the first and second data interfaces between a first DSL transceiver closest to the central office interface and a second DSL transceiver next closest to the central office interface respectively operate at a downstream date rate set by the first DSL transceiver closest to the central office interface, and wherein additional next closest DSL transceiver pairs from the central office interface operate at a downstream data rate set by the first DSL transceiver closest to the central office interface, respectively.

32. The multiple DSL communication system of claim 30, wherein the first and second data interfaces between a last DSL transceiver furthest from the central office interface and a next closest DSL transceiver closer to the central office interface operate at an upstream data rate set by the last DSL transceiver furthest from the central office interface and wherein subsequently closer DSL transceiver pairs to the central office interface operate at an upstream data rate set by the last DSL transceiver furthest from the central office interface, respectively.

33. The multiple DSL communication system of claim 30, wherein DSL transceiver data transmissions are performed via a pulse coded modulation (PCM) data transfer protocol.

34. The multiple DSL communication system of claim 30, wherein DSL transceiver data transmissions are performed via an asynchronous transfer mode (ATM) data transfer protocol.

35. The multiple DSL communication system of claim 34, further comprising:
   an ATM cell synchronization signal operative in parallel and co-directional with each of the plurality of DSL transceiver data transmission links.

36. The multiple DSL communication system of claim 35, wherein the ATM cell synchronization signal is configured to identify an ATM cell header.

37. A multiple digital subscriber line (DSL) communication system, comprising:
   means for communicating with a central office equipment to receive a downstream data transmission;
   means for distributing a portion of the received downstream data transmission to each of a plurality of DSL communication links for transmission via serially connected DSL transceivers in communication with each other;
   means for receiving a portion of an upstream data transmission distributed across each of the plurality of DSL communication links;

means for combining the portions of the upstream data transmission such that the upstream data transmission is via the serially connected DSL transceivers in communication with each other;

means for configuring the rate of the upstream and downstream data transmissions being driven by the last DSL transceiver that is farthest from a customer interface, with the rate of the upstream and downstream data transmissions between two previous DSL transceivers being derived from the rate of the upstream and downstream data transmissions of a subsequent DSL transceiver; and means for communicating a reconstructed upstream data transmission to the central office equipment.

38. The multiple DSL communication system of claim 37, wherein the means for receiving the portion of the upstream data transmission is accomplished via a plurality of DSL transceivers dedicated to receive the portion of the upstream data transmission from a predetermined remote DSL transceiver.

39. The multiple DSL communication system of claim 37, wherein a plurality of DSL transceiver is in further communication with a first data interface and a second data interface interposed in a communication link between the serially connected DSL transceivers.

40. A method for transferring data between multiple DSL transceivers at a central office, comprising:

recovering a mapped portion of an upstream data stream at each of the multiple DSL transceivers;

using a first data interface coupled to each respective DSL transceiver to communicate the recovered mapped portion of the upstream data stream to the next closest DSL transceiver to a central office interface;

mapping a downstream data stream such that a portion of the downstream data stream is designated for transmission by each of the multiple DSL transceivers; and using a second data interface coupled to each respective DSL transceiver to communicate mapped portions of the downstream data stream to the next furthest DSL transceiver from the central office interface.

41. The method of claim 40, wherein the first data interface coupled to each DSL transceiver is configured to communicate portions of the upstream data stream to the second data interface of the next closest DSL transceiver to the central office interface.

42. The method of claim 40, wherein the second data interface coupled to each DSL transceiver is configured to communicate with the first data interface of the next furthest DSL transceiver from the central office interface.

43. The method of claim 40, wherein the first and second data interfaces comprise serial data interfaces.

44. The method of claim 40, wherein the first and second data interfaces comprise bi-directional data interfaces.

45. The method of claim 40, wherein the first and second data interfaces comprise independent data interfaces.

46. The method of claim 40, wherein DSL transceiver communications are performed via a data transfer protocol.

47. The method of claim 46, wherein the data transfer protocol is accomplished with a pulse-code modulation (PCM) protocol.

48. The method of claim 46, wherein the data transfer protocol is accomplished with an asynchronous transfer mode (ATM) protocol.

49. The method of claim 40, further comprising:

identifying mapped portions of the downstream data stream designated for transmission at each of the multiple DSL transceivers; and transmitting the mapped portion.

50. The method of claim 40, further comprising:

reconstructing the recovered mapped portions of the upstream data stream at each of the multiple DSL transceivers; and communicating the reconstructed upstream data stream to the central office interface.

* * * * *